United States Patent [19]

Brodsky

[11] 3,716,844

[45] Feb. 13, 1973

[54] IMAGE RECORDING ON TETRAHEDRALLY COORDINATED AMORPHOUS FILMS

[75] Inventor: Marc H. Brodsky, Mount Kisco, N.Y.

[73] Assignee: International Business Machines Corporation, Armonk, N.Y.

[22] Filed: July 29, 1970

[21] Appl. No.: 59,172

[52] U.S. Cl. ..........340/173 LS, 96/88, 340/173 LM, 346/135, 346/76 L

[51] Int. Cl.....G11c 13/02, G11c 13/04, G01d 15/14

[58] Field of Search....................................96/88; 101/1; 340/173 LM, 173 LS; 346/135, 76L

[56] References Cited

UNITED STATES PATENTS

| | | | |
|---|---|---|---|
| 3,505,658 | 4/1970 | Fan | 340/174 |
| 3,226,696 | 12/1965 | Dove | 340/173 LM |
| 3,314,073 | 4/1967 | Becker | 346/76 L |
| 3,560,994 | 2/1971 | Wolff | 346/76 L |
| 3,401,268 | 9/1968 | Lea | 340/173 LM |

OTHER PUBLICATIONS

Dakss, Optical Memory, Display and Processor Elements Using Amorphous Semiconductors, IBM Technical Disclosure Bulletin, Vol. 13, No. 1, pp. 96–98.

*Primary Examiner*—Stanley M. Urynowicz, Jr.
*Assistant Examiner*—Stuart Hecker
*Attorney*—Hanifin and Jancin and Hansel L. McGee

[57] ABSTRACT

An image can be recorded on a layer of an amorphous material such as Si, Ge, or SiC, by using a beam of electrons or light to locally heat the amorphous material in a predetermined pattern. The image can be optically observed directly after recording or can be reproduced from the transparency. The invention can be used in beam addressable memory devices, in display units, as a hard copy output without the need for development and the like.

19 Claims, 3 Drawing Figures

PATENTED FEB 13 1973

3,716,844

INVENTOR
MARC H. BRODSKY

BY Hansel L. McGee
ATTORNEY

IMAGE RECORDING ON TETRAHEDRALLY COORDINATED AMORPHOUS FILMS

BACKGROUND OF THE INVENTION

Field of the Invention

Recently, it has been discovered that materials having both amorphous and crystalline phases, possible at room temperature, can be used as electrical memory or switching devices. These materials exhibit changing resistivity with the application of heat or when a voltage is applied thereacross. These materials are changed from a highly resistive state when in their amorphous state to a conductive state when they become crystalline.

The materials used in these devices, commonly called "ovonic devices" are generally the chalcogenides of any metal or metalloid or intermetallic compound. For example, in U. S. Pat. No. 3,271,591 there are disclosed devices prepared from glasses which are mixtures of germanium, arsenic, tellurium and silicon, vanadium pentoxide, and the like.

It is desirable to take advantage of the changes in optical properties resulting from heat treatments of amorphous materials and the amorphous-crystalline phase transition of these semiconductor glasses to provide image displays, hard copy outputs, the information storage media in beam addressable memory devices and the like. However, the materials of the prior art ovonic devices are multicomponent, therefore, these materials are not capable of providing gray tones since changes in their absorptance occur only between their amorphous and crystalline phases.

SUMMARY OF THE INVENTION

It has been discovered here that highly absorbing thin films of amorphous materials such as Si, Ge, and SiC, when subjected to localized heating from a moderate intense laser or electron beam exhibit some degree of transparency even in the amorphous state and are substantially transparent in their crystalline state. These materials can be used for recording images having gray tones. The recorded images can be read optically or by the human eye. The invention is thus directed to an optical memory or imaging device characterized by the local heating of a film formed from an amorphous material. These materials are characterized in that their optical properties depend on thermal history while in their amorphous phase and further changes in their optical properties occur after suitable heating that renders the material partially or substantially crystalline. That is, the room temperature optical properties change with any annealing at a higher temperature than that to which the material had been previously subjected.

OBJECTS OF THE INVENTION

It is therefore, an object to provide a method of recording information on materials having amorphous to crystalline phase transitions.

It is another object of the invention to provide a method of recording information on amorphous materials without changing them from the amorphous phase.

It is another object of the invention to provide a method of recording information on amorphous films prepared from Si, Ge, or SiC.

Yet another object of the invention is to provide a device for recording and optically reading information on an amorphous film.

DESCRIPTION OF THE PREFERRED EMBODIMENTS

Generally, this invention provides a method for recording information or images on amorphous substrates, defining locales for these images by an energetic beam such as an electron beam or a laser beam. The recorded information can be read by optical means or by the human eye. With greater particularity, this invention is directed to the use of an amorphous film of semiconductor material as an image producing film by localized heating of the same. As the amorphous material is heated locally it undergoes a change in its optical properties. Thus, by controlled heating of various areas of the film, an image having gray tones can be obtained.

Figure 1:
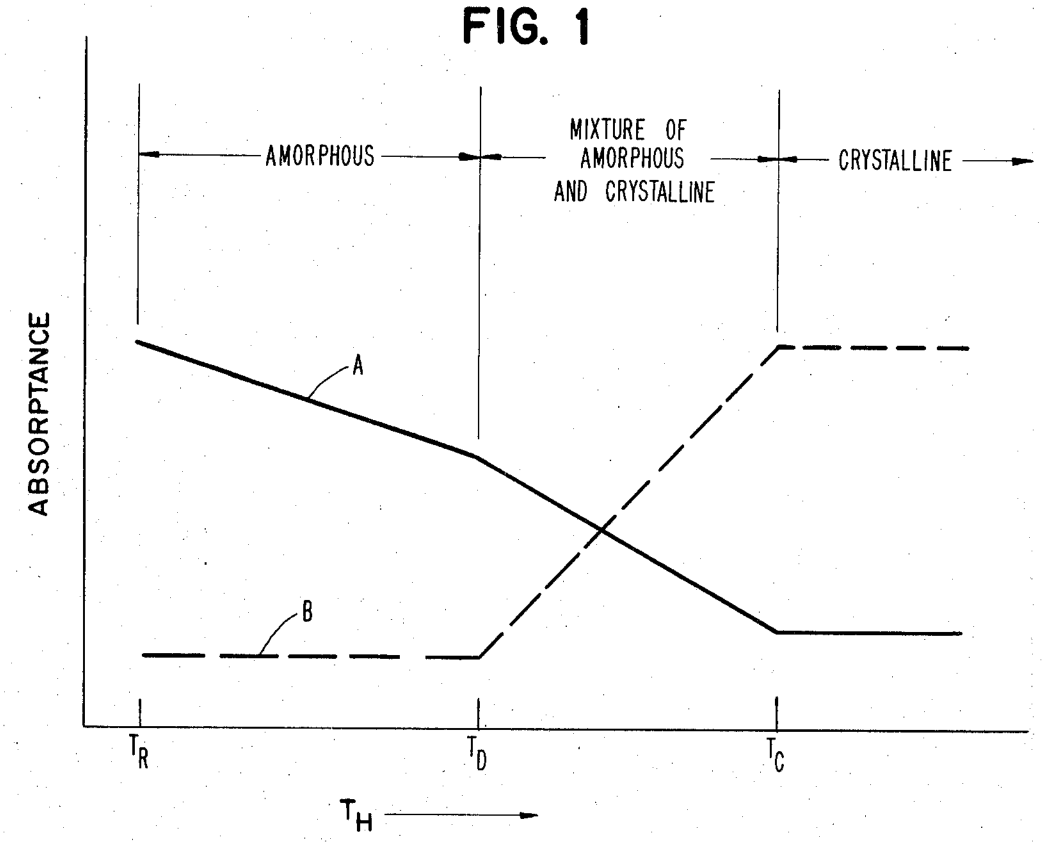
FIG. 1 is a curve comparing the change in the room temperature absorptance with temperature history of the amorphous material of this invention with the chalcogenide glasses of the prior art.

The absorptance of an amorphous silicon film of the type used in this invention is graphically depicted as a function of its thermal history by line A in FIG. 1. It is seen that the absorptance of the material, at a particular temperature, e.g., room temperature $T_R$, is initially high at some wavelength, e.g., in the red region of the spectrum, for amorphous silicon. It should be noted that absorptance of a substance is directly related to the reflectance thereof. Thus initially, the amorphous material beside being highly absorbant, is also highly reflective, i.e., it is substantially opaque to light. After heating to an annealing temperature $T_H$ and cooling back down to the original temperature, the material becomes more transparent to light, i.e., less absorbing and reflective, for all temperatures up to a temperature $T_D$, the devitrification temperature of the material, e.g., about 600°C for amorphous Si, at which point crystallization begins to occur. Between the temperatures $T_D$ (the temperature at which some crystallization first appears) and $T_c$ (the temperature of total crystallization) $\approx$ 900°C for Si, the absorptance is dependent upon the degree of crystallization in the material. Above $T_c$ the material is essentially all crystalline and the absorptance thereafter depends upon such parameters as purity and crystal defects. For undoped or only slightly doped Si films, the absorptance in the visible region of the spectrum is much lower than for amorphous silicon.

While the values given are for the materials prepared in the manner described herein, it should be understood that these values are dependent upon parameters such as method of preparation and environment of preparation and subsequent handling.

Line B of FIG. 1 represents the relationship of absorptance and temperature for a multicomponent chalcogenide glass such as is used in the ovonic devices of the prior art. Such materials can include As, Te, Ge, etc. It is noted that large changes in absorptance of the materials occur only at and above the devitrification temperature ($T_D$) and that no significant change occurs while the materials are still in their amorphous state. It is also seen that with increasing crystallinity the material increases in absorptance or reflectance. This effect is probably due to the formation of multiphase crystallites which appear to crystallize out of the multicomponent amorphous material. It has been noted that the range of temperatures between $T_D$ and $T_c$ is much smaller for the prior art chalcogenide glasses than for the materials of this invention thus precluding the practical use of chalcogenides for gray tone imaging.

Amorphous films anticipated by this invention can be prepared by generally known evaporation or sputtering techniques. It is important that the temperature of the substrate upon which the amorphous material is to be evaporated or sputtered be maintained below a critical temperature so that the deposited film does not crystallize. For example, in the case for amorphous Ge films, it is necessary that the substrate temperature be below 300°C and preferably below 200°C. The substrate material can be any material that is supportive of a thin film. For example, transparent or opaque glass, quartz, sapphire, mylar or other flexible polymeric materials, and the like can be used.

By way of example, the preparation of an amorphous Si film is hereinafter given.

Films of Si were deposited on sapphire substrates which were held at or below room temperature. The films were deposited by *rf* sputtering of a 6 inch diameter intrinsic silicon cathode. During the deposition, thermal contact between the substrate and a water-cooled copper block was made by painting the contact area with gallium. The sputtering was carried out in an argon atmosphere at a pressure of 0.01 Torr after pre-evacuation of the oil and titanium ion pumped chamber to $10^{-7}$ Torr. Deposition rates were in the range between 200 and 600A/min. The thicknesses of the Si layers varied optimally from 0.3 $\mu$m to about 2 $\mu$m.

The films grown in this manner were opaque and had smooth silvery mirror faces. The films were hard, adhered well to the substrates and could be handled extensively.

Other films of amorphous Ge and SiC have been similarly prepared by the above technique. The common feature of these materials is that they have an average valence of four and are substantially tetrahedrally coordinated. It is believed that other average valence four amorphous materials, such as the III-V's (e.g., GaAs, InSb, etc.) the II-VI's (e.g., CdS, ZnSe, etc.) and the II-IV-VI's (e.g., Cd Ge $P_2$, Cd Ge $As_2$, etc.), are of a similar structure and will behave in the same manner as amorphous Si, Ge, and SiC. An exemplary background text on evaporation of materials is: "Vacuum Deposition of Thin Films," L. Holland, John Wiley and Sons, Inc. (1958).

The practice of this invention for an embodiment thereof will now be described with reference to FIG. 2, which is a schematic view of a recording and read out device utilizing the amorphous film of the invention.

An amorphous film 10 is established on substrate 11. Light, laser or electron beam source 12 provides focused beam 13 to the surface of film 10 which locally heats the film. A conventional system for programmed deflection is used for the light, laser or electron beam 13. The programmed deflection can readily be obtained with a fixed direction beam on a substrate which is moved mechanically relative to the beam in a desired pattern or by beam deflection or by a combination of beam and film movements. The temperature required to start the amorphous-crystalline transformation will vary with the material used. For example, a temperature of about 300°–400°C is required for Ge, about 400°–600°C for Si, and about 800°–900°C for SiC. Thus, by careful control of beam 13, it is possible to control localized heating of the film 10 and thereby control the degree to which the amorphous film anneals or the amorphous-crystalline transformation extends. That is, the gray tones in a given image can be controlled thereby.

The image produced as above may be viewed optically or by the human eye depending upon the degree of annealing or crystallization obtained. If the film 10 is heated to its crystallization temperature, then the image will be substantially transparent and viewable by the eye. Optically, the image or information can be viewed by optical means 15 which is provided for detecting transmitted light 14. The information can also be viewed by optical means 17 which detects reflected light 16.

Figure 2:
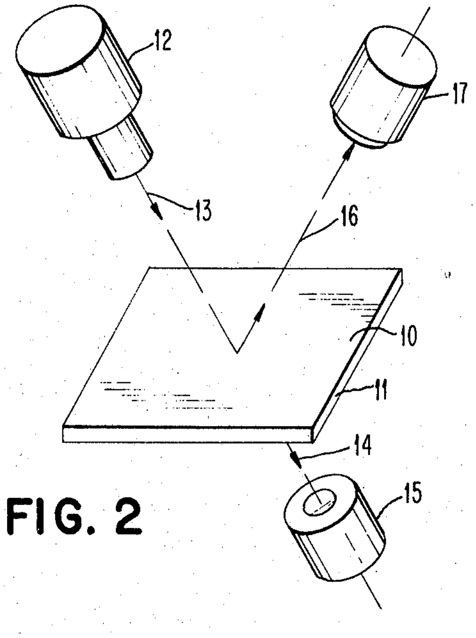
FIG. 2 is a schematic diagram illustrating the writing and optical reading operation of information recorded on an amorphous film of this invention.

In the practice of this invention, such arrangement as shown in FIG. 2 can be readily adaptable to a beam addressable memory as proposed in application Ser. No. 563,823, "Beam Addressable Memory," filed July 8, 1966 by G. Fan, et al., commonly assigned, now U.S. Pat. No. 3,505,658.

In another embodiment of this invention, amorphous films with the properties of curve A, FIG. 1 can be used to produce beam or otherwise thermally written hard copy prints viewable in reflection (like a photographic print) or in transmission (like a photographic transparency). The advantage of such hard copies is that no development process as in conventional photography, is necessary. In practice such a hard copy would have its gray tones controlled by the amount of heating of the film. Furthermore, multicolor images could be obtained by using different layers of amorphous films which preferentially absorb different wavelengths of light and in turn exhibit different colors in transmission or reflection after being heated.

Figure 3:
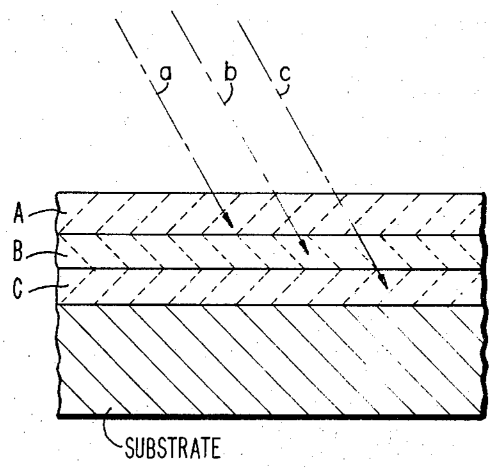
FIG. 3 is a schematic diagram illustrating the recording of multicolor hard copy images on the amorphous materials of this invention.

In FIG. 3 there is provided an illustration of a hard copy device comprising a substrate having disposed thereon layers of amorphous materials. In the example shown there are three layers shown, A, B, and C, each layer functioning to absorb a different wavelength or energy of the writing beams, *a*, *b*, and *c*. For example, layer A may absorb wavelength *a*, but not *b* or *c* (e.g., layer could be amorphous SiC and the wavelength of beam could be in the blue region of the spectrum). Layer 13 may absorb wavelength *b*, but not *c* (e.g., layer 13 could be amorphous GaP and the wavelength of *b* could be in the yellow-orange region of the spectrum). Layer *c* may absorb wavelength *c* (e.g., layer C could be amorphous Si and wavelength *c* could be in the red region of the spectrum). In this manner a multicolor image can be obtained with white light illumination for viewing.

While the invention has been particularly shown and described with reference to preferred embodiments thereof, it will be understood by those skilled in the art that materials having the capability of undergoing optical changes in the amorphous region and the amorphous-crystalline transformation region can be used similarly to those materials disclosed; and that other changes in form and details may be made therein without departing from the spirit and scope of the invention.

What is claimed is.

1. A method of recording images on amorphous films including the steps of:

a. preparing an amorphous film from a tetrahedrally coordinated material on a substrate, said film having its room temperature absorptance decrease with annealing at higher temperatures in its amorphous state, said film also having an amorphous to crystalline phase transformation, and b. locally heating said amorphous film by a radiation beam in a predetermined pattern to provide an image thereon.

2. A method according to claim 1 wherein said tetrahedrally coordinated material is selected from the group consisting of amorphous Si, Ge and SiC.

3. A method according to claim 1 wherein said tetrahedrally coordinated material is amorphous Si.

4. A method according to claim 1 wherein said tetrahedrally coordinated material is amorphous Ge.

5. A method according to claim 1 wherein said tetrahedrally coordinated material is amorphous SiC.

6. A method according to claim 1 wherein there is added the step of controlling the localized heating of said film while retaining it in its amorphous state to thereby effect gray tones in said image.

7. A method according to claim 1 wherein there is added the step of controlling the localized heating of said film while retaining it in a mixture of its amorphous and crystalline states to thereby effect gray tones in said image.

8. A device for recording and reading information comprising:

a. a substrate having a disposed thereon an amorphous film prepared from a tetrahedrally coordinated material on a substrate, said film having its room temperature absorptance decrease with annealing at higher temperatures in its amorphous state, said film also having an amorphous to crystalline phase transformation, and b. beam means for locally heating said amorphous film in a predetermined pattern thereby changing its optical properties and thereby providing an image; and c. optical means for viewing said image.

9. A device according to claim 8 wherein said tetrahedrally coordinated material is selected from the group consisting of Si, Ge and SiC.

10. A device according to claim 8 wherein said amorphous film is a film of amorphous Si.

11. A device according to claim 8 wherein said amorphous film is a film of amorphous Ge.

12. A device according to claim 8 wherein said amorphous film is a film of amorphous SiC.

13. The device of claim 8, wherein there are three layers of said amorphous film, each said layer absorbing energy of a different wavelength.

14. An article for recording hard copy images comprising:

a. a substrate b. at least one layer of an amorphous film said amorphous film being prepared from a tetrahedrally coordinated material and having its room temperature absorptance decrease with annealing at a higher temperature in its amorphous state, said film also having an amorphous to crystalline phase transformation.

15. An article according to claim 14 wherein said tetrahedrally coordinated material is selected from the group consisting of Si, SiC and Ge.

16. An article according to claim 14 where at least one layer of said amorphous film is amorphous Si.

17. An article according to claim 14 wherein at least one layer of said amorphous film is amorphous SiC.

18. An article according to claim 14 wherein at least one layer of said amorphous film is amorphous Ge.

19. An article according to claim 14 wherein there are three layers of said amorphous film consisting of a layer of amorphous Si, a layer of amorphous SiC and a layer of amorphous Ge.

* * * * *